United States Patent [19]
Ura et al.

[11] 3,919,363
[45] Nov. 11, 1975

[54] PROCESS FOR PREPARING POLY(SULFONYL-PHENYLENE)PHENYL-PHOSPHONATE

[75] Inventors: Yasukazu Ura; Yoshiharu Mori; Gojyo Sakata; Hideki Takamatsu; Keiichi Kondo, all of Funabashi, Japan

[73] Assignee: Nissan Chemical Industries, Ltd., Japan

[22] Filed: Apr. 30, 1974

[21] Appl. No.: 465,525

[52] U.S. Cl. ............................... 260/973; 260/929
[51] Int. Cl.² .......................................... C07F 9/40
[58] Field of Search ............................ 260/929, 973

[56] References Cited
UNITED STATES PATENTS
3,578,731   5/1971   Mange et al. ..................... 260/929

*Primary Examiner*—Anton H. Sutto
*Attorney, Agent, or Firm*—Oblon, Fisher, Spivak, McClelland & Maier

[57] ABSTRACT

Poly(sulfonyldiphenylene)phenylphosphonate is prepared in solution by polycondensing dihydroxydiphenylsulfone and phenylphosphonic dichloride in tetrachloroethane. The viscosity of the resulting solution is decreased by adding 0.1 to 25% of methanol and the polymer may be precipitated from solution by adding said solution to a methanol bath.

8 Claims, 2 Drawing Figures

PROCESS FOR PREPARING POLY(SULFONYL-PHENYLENE)PHENYLPHOSPHONATE

BACKGROUND OF THE INVENTION

1. Field of the Invention

This invention relates to a process for preparing polyphenylphosphonate. More particularly, it relates to a process for preparing poly(sulfonyldiphenylene)phenylphosphonate by polycondensing dihydroxydiphenylsulfone and phenylphosphonic dichloride.

2. Description of the Prior Art

The preparation of polyphenylphosphonates by polycondensing substantially equivalent amounts of dihydroxydiphenylsulfone and phenylphosphonic dichloride at 150°–250°C in an inert gas at atmospheric pressure followed by reduced pressure in the presence of a magnesium chloride or calcium chloride catalyst is well known. Further prior art procedures for preparing polyphenylphosphonates include interfacial polymerization by reacting a stirred solution of phenylphosphonic dichloride in methylenechloride with an aqueous solution of an alkali metal salt of dihydroxydiphenylsulfone, and by polycondensing the reactants in 1,1,2,2-tetrachloroethane and precipitating the polymer with methanol. These methods suffer from the disadvantage that the polymer solution so produced is of extremely high viscosity. A need therefore exixts for a polymer solution which may be easily poured, transferred, or filtered. A further need exists for a polymer which may be brought out of solution in a usable form.

SUMMARY OF THE INVENTION

Accordingly, one object of this invention is to provide a process for preparing polyphenylphosphonate having a suitable degree of polymerization.

Another object of this invention is to provide a process for preparing a solution of polyphenylphosphonate having a low viscosity.

A further object of this invention is to provide a process for preparing a stable dispersion of polyphenylphosphonate, and then separating said dispersion.

These and other objects of this invention as will hereinafter become more readily understood by the following description can be attained by a process for preparing poly(sulfonyldiphenylene)phenylphosphonate by polycondensing dihydroxydiphenylsulfone and phenylphosphonic dichloride in 1,1,2,2-tetrachloroethane and treating the resulting solution as follows:

The viscosity of the solution of poly(sulfonyldiphenylene)phenylphosphonate in 1,1,2,2-tetrachloroethane may be decreased by adding 0.1 to 25% of methanol based on total solvent. The solution of poly(sulfonyldiphenylene)phenylphosphonate in 1,1,2,2-tetrachloroethane is added dropwise to methanol under the conditions of the stable dispersing zone shown in FIG. 1. In said polycondensation, the water content of the dihydroxydiphenylsulfone is decreased to less than 1 mole % by azeotropic distillation of a mixture of dihydroxydiphenylsulfone and 1,1,2,2-tetrachloroethane.

DETAILED DESCRIPTION OF THE EMBODIMENTS

In the process of this invention, dihydroxydiphenylsulfone having the formula (I):

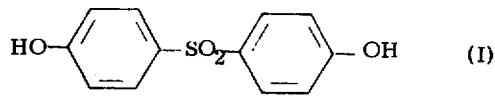

and phenylphosphonic dichloride having the formula (II):

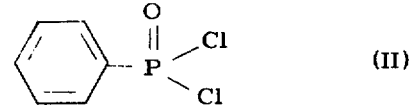

are polycondensed in 1,1,2,2-tetrachloroethane to prepare a solution of poly(sulfonyldiphenylene)phenylphosphonate having the formula (III):

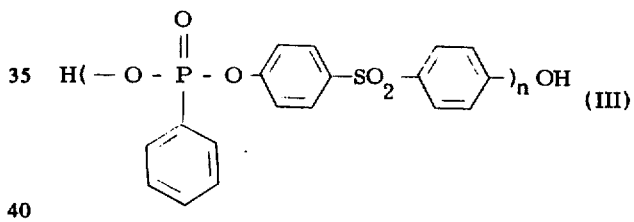

($n$ is an integer of 6 or higher, up to 100).

The polycondensation may be carried out at the reflux temperature of tetrachloroethane. The molar ratio of phenylphosphonic dichloride to dihydroxydiphenylsulfone is 0.9 to 1.1, preferably 0.99 to 1.01, and the ratio of tetrachloroethane to the resulting poly(sulfonyldiphenylene)phenylphosphonate is preferably more than 2 times by weight. The hydrogen chloride gas discharged in the polycondensation is absorbed and recovered in alkali.

The tetrachloroethane and methanol solvent mixture separated from the process of precipitate-dispersing are separated by distillation.

The water content of the dihydroxydiphenylsulfone and 1,1,2,2-tetrachloroethane can be decreased to lower than 1 mole % by employing a suitable dehydration apparatus. However, water may be economically and effectively removed by conventional azeotropic distillation of the mixture of dihydroxydiphenylsulfone and 1,1,2,2-tetrachloroethane. Any type of azeotropic distillators may be employed for the distillation. The resulting dried suspension of dihydroxydiphenylsulfone in 1,1,2,2-tetrachloroethane is admixed with an approximately equimolar amount of phenylphosphonic dichloride and the mixture is polycondensed either in the presence, or absence, of a catalyst. Suitable catalysts include calcium chloride, magnesium chloride, or the like. In accordance with the azeotropic distillation-polycondensation process, poly(sulfonyldiphenylene)-phenylphosphonate having a degree of polymerization of more than 20 can be obtained, in the form of a solution.

Figure 2:
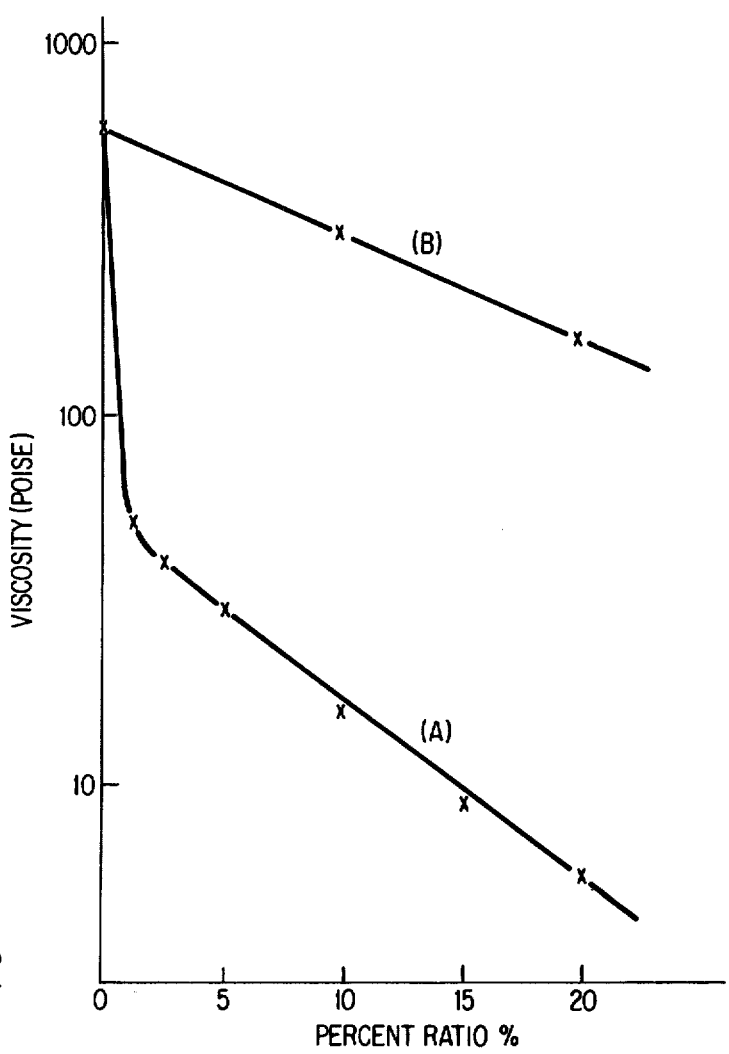
FIG. 2(A) is a graph of the viscosity of the solution of poly(sulfonyldiphenylene)phenylphosphonate vs. concentration of methanol in the total solvent.
FIG. 2(B) is a graph of the viscosity of the solution of poly(sulfonyldiphenylene)phenylphosphonate to the rate of the added 1,1,2,2-tetrachloroethane in total tetrachloroethane.

A solution of poly(sulfonyldiphenylene)phenylphosphonate in 1,1,2,2-tetrachloroethane has such a high viscosity that it is quite difficult to transfer, to filter, or to add dropwise said solution to methanol for precipitate-dispersing. Even if the ratio of 1,1,2,2-tetrachloroethane to the solid component is increased, the decrease in viscosity of the solution is not marked, as shown in FIG. 2B. Moreover, when poly(sulfonyldiphenylene)phenylphosphonate is precipitated in methanol, and the ratio of 1,1,2,2-tetrachloroethane to the solid component is first increased, the amount of methanol required for the precipitate-dispersing is subsequently increased, whereby a prohibitively large size reaction apparatus is required and the expense of recovery is increased. If the solution is heated to decrease the viscosity, the temperature of the methanol required for precipitate-dispersing will increase and cause unstable coagulation. In accordance with the process of this invention, 0.1 to 25% by weight of methanol based on total solvent is added to the solution of poly(sulfonyldiphenylene)phenylphosphonate in 1,1,2,2-tetrachloroethane whereby the viscosity of the solution decreases, as shown in FIG. 2(A). As methanol is a coagulating agent for poly(sulfonyldiphenylene)phenylphosphate, the polymer will be precipitated in the reactor and cause working difficulties if the amount of methanol is high. Accordingly, the amount of methanol should be limited so as not to precipitate poly(sulfonyldiphenylene)phenylphosphate. No precipitation is found if 25% by weight of methanol is added, based on total solvent.

Methanolysis of poly(sulfonyldiphenylene)phenylphosphonate is at a low level below 40°C. The effect of viscosity decrease is marked below 40°C. In accordance with the process of this invention for decreasing the viscosity of the solution, the particle size of coagulated poly(sulfonyldiphenylene)phenylphosphonate in the following process for precipitate-dispersing can be easily controlled to achieve the best conditions for filteration and drying.

Figure 1:
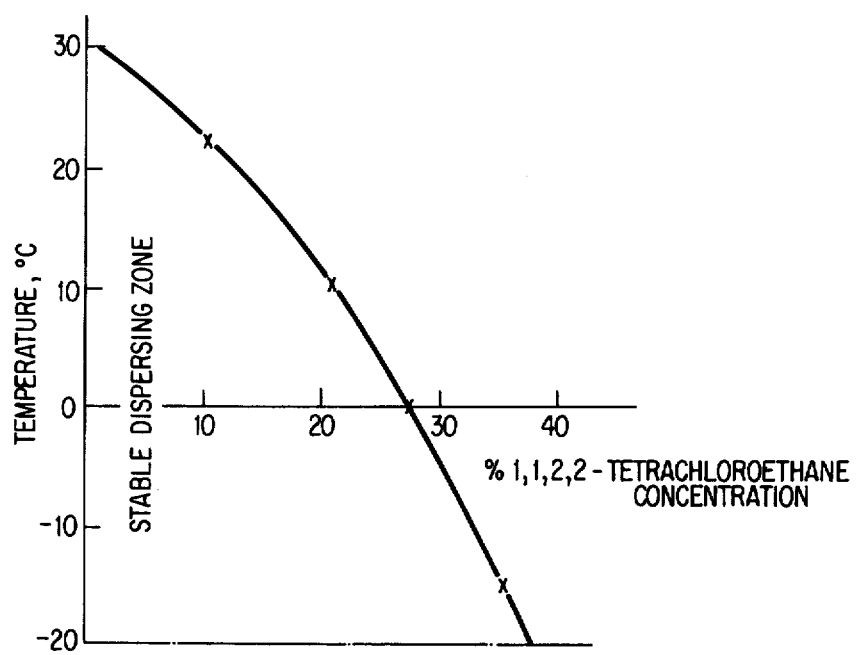
FIG. 1 is a graph of precipitation temperature vs. concentration of 1,1,2,2-tetrachloroethane in the total solvent, showing a stable dispersing zone.

In the precipitate-dispersing process, the solution of poly(sulfonyldiphenylene)phenylphosphonate (preferably in which methanol has been added to decrease the viscosity thereof) is added to dropwise to methanol with stirring under the conditions of the stable dispersing zone shown in in FIG. 1. The conditions were determined by the following experiments:

Solutions of 20% poly(sulfonyldiphenylene)phenylphosphonate having a degree of polymerization of 30 and an average molecular weight of 11,000 (measured by the osmopressure method) in tetrachloroethane were added dropwise to anhydrous methanol from a nozzle having a diameter of 1 mm with vigorous stirring at bath temperatures of −10°C, 0°C, 20°C or 30°C so as to give concentrations of tetrachloroethane of 10, 20 or 30%. Dispersion or coagulation resulted. The coagulation results of poly(sulfonyldiphenylene)phenylphosphonate are shown in Table 1.

TABLE 1

| tetrachloroethane (%) | temperature of bath | | | | |
|---|---|---|---|---|---|
| | −10°C | 0°C | 10°C | 20°C | 30°C |
| 0 | disperse | disperse | disperse | disperse | disperse |
| 10 | " | " | " | " | coagulate |
| 20 | " | " | " | coagulate | " |
| 30 | " | coagulate | coagulate | " | " |

Solutions of 25% poly(sulfonyldiphenylene)phenylphosphonate having a degree of polymerization of 20 and a molecular weight of 7,400 in tetrachloroethane were added dropwise to methanol from a nozzle having a diameter of 1 mm with vigorous stirring at bath temperatures of −5°C, 5°C, 15°C, 25°C or 35°C so as to give concentrations of tetrachloroethane of 10, 20, or 30%. The coagulation results of poly(sulfonyldiphenylene) phenylphosphonate are shown in Table 2.

TABLE 2

| tetrachloroethane (%) | temperature of bath | | | | |
|---|---|---|---|---|---|
| | −5°C | 5°C | 15°C | 25°C | 35°C |
| 0 | disperse | disperse | disperse | disperse | coagulate |
| 10 | " | " | " | coagulate | " |
| 20 | " | " | coagulate | " | " |
| 30 | " | coagulate | " | " | " |

The stable dispersing zone shown in FIG. 1 was decided by experiment.

When the polymer solution is added to methanol under conditions which are out of the stable dispersing zone, the resulting precipitate of poly(sulfonyldiphenylene)phenylphosphonate will be so tacky that it will coagulate immediately and the polymer will be difficult to separate. When the polymer solution is added to methanol under conditions which are in the stable dispersing zone, a stable dispersion which will be easy to separate and to filter will be obtained.

Having generally described the invention, a more complete understanding can be obtained by reference to certain specific examples, which are included for purposes of illustration only and are not intended to be limiting unless otherwise specified.

EXAMPLE 1

A flask was charged with 125.15 g (0.5 mole) of dihydroxydiphenylsulfone and 433 g of 1,1,2,2-tetrachloroethane. The water content of the mixture was 850 ppm which corresponds to 5.2 mole % in the dihydroxydiphenylsulfone. The mixture was heated to azeotropically distill off 133 g of 1,1,2,2-tetrachloroethane. Thereafter the water content of the mixture was 100 ppm, which corresponds to 0.47 mole %. To the mixture, 97.5 g (0.5 mole) of phenylphosphonicdichloride and 0.4 g of catalyst of calcium chloride catalyst was added, and the mixture was heated at the boiling point of tetrachloroethane for 20 hours to polycondense the reactants and to obtain a viscous solution of poly(sulfonyldiphenylene) phenylphosphonate in 1,1,2,2-tetrachloroethane. The solution was diluted by adding 267 g of tetrachloroethane and was added dropwise to 2.67 liters of methanol to precipitate the polymeric material. The resulting poly(sulfonyldiphenylene)phenylphosphonate had an average molecular weight of 9700 (measured by the osmopressure method), and a degree of polymerization of 26.

When the polycondensation was carried out without an azeotropic distillation, the resulting poly(sulfonyldiphenylene)phenylphosphonate had an average molecular weight of 5950 and a degree of polymerization of 16. The relationship of the water content to degree of polymerization and average molecular weight of the resulting polymer is shown in Table 3.

TABLE 3

| Water content (mole %) | Average molecular weight | Polymerization degree |
|---|---|---|
| 0.47 | 9700 | 26 |
| 0.95 | 8200 | 22 |
| 1.80 | 7000 | 19 |
| 3.60 | 6300 | 17 |
| 5.20 | 6000 | 16 |

EXAMPLE 2

To 1000 g of a 30% solution of poly(sulfonyldiphenylene)phenylphosphonate (degree of polymerization of 25, molecular weight 9,300) in 1,1,2,2-tetrachloroethane was added 78 g of methanol at 30°C, and the mixture was stirred. The viscosity of the solution before the addition of methanol was 600 poises at 30°C, while that of the solution after the addition of methanol was 16 poises at 30°C. On the contrary, the viscosity of the solution to which an additional 78 g of 1,1,2,2-tetrachloroethane was added was 300 poises at 30°C.

EXAMPLE 3

To 1000 g of a 25% solution of poly(sulfonyldiphenylene) phenylphosphonate (degree of polymerization 30, molecular weight of 11,000) was added 39.5 g of methanol and the mixture was stirred. The viscosity of the solution before the addition of methanol was 150 poises at 30°C while that of the solution after the addition of methanol was 15 poises at 30°C. On the contrary, the viscosity of the solution to which an additional 39.5 g of 1,1,2,2-tetrachloroethane was added, was 100 poises at 30°C.

EXAMPLE 4

To 390 g of anhydrous methanol was added dropwise with vigorous stirring 100 g of a 20% solution of poly(sulfonyldiphenlene) phenylphosphonate (degree of polymerization 25, molecular weight 9,300) from a nozzle having a diameter of 1 mm at 10°C whereby a dispersion of poly(sulfonyldiphenylene)phenylphosphonate which was easily filterable was obtained. The temperature of the bath used in the precipitation was 10°C and the content of tetrachloroethane in the bath was 0% at the beginning and 17% at the end of the addition.

EXAMPLE 5

To 240 g of anhydrous methanol was added dropwise with vigorous stirring 100 g of a 20% solution of poly(sulfonyldiphenylene) phenylphosphonate (degree of polymerization 20 and molecular weight 7,400) from a nozzle having a diameter of 1 mm at 0°C, whereby a dispersion of poly(sulfonyldiphenylene)phenylphosphonate which was easily filterable was obtained. The temperature of the bath used in the precipitation was 0°C, and the content of tetrachloroethane in the bath was 0% at the beginning and 25% at the end of the addition.

EXMAPLE 6

A mixture of 100 g of a 20% solution of poly(sulfonyldiphenylene) phenylphosphonate (degree of polymerization 30 and molecular weight 11,000) and 4 g of methanol was added dropwise from a nozzle having a diameter of 1 mm to 240 g of anhydrous methanol with vigorous stirring at 0°C, whereby a dispersion of poly(sulfonyldiphenylene)phenylphosphonate which was easily filterable was obtained. The temperature of the bath used in the precipitation was 0°C and the content of tetrachloroethane in the bath was 0% at the beginning and 23.5% at the end of the addition.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing poly(sulfonyldiphenylene)phenylphosphonate which comprises polycondensing dihydroxydiphenylsulfone and phenylphosphonic dichloride in tetrachloroethane, decreasing the viscosity of the resulting solution by adding 0.1 –2.5% of methanol based on total solvent and adding the solution to a methanol bath to precipitate poly(sulfonyldiphenylene)phenylphosphonate.

2. The process of claim 1, wherein the water content of the dihydroxydiphenylsulfone is decreased to less than 1 mole % by azeotropic distillation of the mixture of dihydroxydiphenylsulfone and tetrachloroethane, before the polycondensation.

3. The process of claim 1, wherein the solution of poly(sulfonyldiphenylene)phenylphosphonate in tetrachloroethane is added gradually to methanol under conditions of the stabe dispersing zone shown in FIG. 1.

4. The process of claim 1, wherein said polycondensation is effected in contact with a catalyst of magnesium chloride or calcium chloride.

5. The process of claim 1, wherein the molar ratio of phenylphosphonic dichloride to dihydroxydiphenylsulfone in the polycondensation is 0.9 to 1.1, preferably 0.99 to 1.01.

6. The process of claim 1, wherein the weight ratio of tetrachloroethane to the resulting poly(sulfonyldiphenylene)phenylphosphonate in the polycondensation is more than 2.

7. The process of claim 1, wherein the said polycondensation is carried out at the reflux temperature of tetrachloroethane.

8. The process of claim 1, wherein the degree of polymerization of the poly(sulfonyldiphenylene)phenylphosphonate is more than 6.

* * * * *